US007799381B2

(12) United States Patent  
Lian et al.

(10) Patent No.: US 7,799,381 B2
(45) Date of Patent: Sep. 21, 2010

(54) CAULKING OR GROUTING METHOD

(76) Inventors: Frank Lian, Nedre Nøttveit 42, N-5238, Rådal (NO); Tor Andre Skeie, Nedre Nøttveit 42, N-5238 Rådal (NO)

(*) Notice: Subject to any disclaimer, the term of this patent is extended or adjusted under 35 U.S.C. 154(b) by 301 days.

(21) Appl. No.: 11/924,630

(22) Filed: Oct. 26, 2007

(65) Prior Publication Data
US 2008/0085366 A1 Apr. 10, 2008

Related U.S. Application Data

(63) Continuation-in-part of application No. 10/489,737, filed as application No. PCT/NO02/00323 on Sep. 13, 2002, now abandoned.

(60) Provisional application No. 60/322,445, filed on Sep. 17, 2001.

(51) Int. Cl.
*B05D 1/32* (2006.01)
(52) U.S. Cl. .................... 427/282; 427/284; 427/285
(58) Field of Classification Search ................. 427/282, 427/284, 285
See application file for complete search history.

(56) References Cited

U.S. PATENT DOCUMENTS

| 3,455,077 | A | | 7/1969 | Long ........................... 52/459 |
| 3,761,992 | A | * | 10/1973 | Schneller ................... 15/210.1 |
| 4,007,835 | A | | 2/1977 | Klothe ......................... 206/411 |
| 4,582,737 | A | * | 4/1986 | Torgerson et al. ............. 428/57 |
| 5,212,002 | A | | 5/1993 | Madrzak |
| 5,246,775 | A | | 9/1993 | Loscuito |
| 5,278,356 | A | | 1/1994 | Miller |
| 5,629,064 | A | | 5/1997 | Sherman |
| 5,658,632 | A | * | 8/1997 | Krabill ........................ 428/43 |
| 5,740,653 | A | | 4/1998 | Dubizhansky |
| D396,958 | S | | 8/1998 | Welch ............................. D5/7 |
| 5,820,958 | A | | 10/1998 | Swallow |
| 6,001,200 | A | | 12/1999 | Hibler ......................... 156/71 |
| D421,528 | S | | 3/2000 | Shakora ....................... D5/99 |
| D448,935 | S | | 10/2001 | Barnholtz et al. ............. D5/53 |
| D452,617 | S | | 1/2002 | Nguyen |
| 6,523,275 | B2 | | 2/2003 | Medford et al. ............... 33/759 |
| D472,319 | S | | 3/2003 | Oltmann .................... D24/189 |
| 6,772,532 | B1 | | 8/2004 | Honea ......................... 33/759 |
| D572,156 | S | | 7/2008 | Payne ......................... D10/71 |
| D596,409 | S | | 7/2009 | Santistiban |
| 2005/0279981 | A1 | | 12/2005 | Onbey |

FOREIGN PATENT DOCUMENTS

| DE | 29801688 | 6/1998 |
| DE | 20203423 | 7/2002 |
| JP | 60-24378 | 2/1985 |
| JP | 10-128192 | 5/1998 |
| WO | 9948618 | 9/1999 |

* cited by examiner

*Primary Examiner*—Frederick J Parker
(74) *Attorney, Agent, or Firm*—Christian Abel

(57) ABSTRACT

A method for caulking or grouting a corner involving providing a tape with two strips of adhesive tape, the strips being spaced apart such that a channel is formed therebetween. A non-adhesive dividing strip is attached to the strips. The strips are folded along the centerline of and rolled upon a cylindrical core (16). The roll is placed against one wall with the folded edge inserted into the corner. Using the roll as a guide the tape is unrolled along the corner by moving the roll along the corner, progressively unrolling tape from the roll and unpeeling the dividing strip. After the tape is in place, caulk or grout is applied in the channel between the adhesive strips.

4 Claims, 6 Drawing Sheets

CAULKING OR GROUTING METHOD

CROSS REFERENCE TO RELATED APPLICATIONS

This application is a Continuation-in-Part application of U.S. Ser. No. 10/489,737, filed 16 Mar. 2004, which was the US National Stage of PCT/NO02/00323 filed 13 Sep. 2002 and claims the benefit of U.S. provisional application 60/322,445 filed 17 Sep. 2001.

FIELD OF THE INVENTION

This invention relates to a method for applying caulk or grout in ceramic tile corners.

BACKGROUND

Ceramic tiles are a common wall and floor covering. It is obviously desirable that the tiles have the most attractive appearance possible. Ceramic tile is typically installed by gluing the tiles to the surface, with great care being used to achieve a regular and uniform pattern. After the glue has dried, the spaces between the tiles are filled with a cement-like substance known as grout. The grout is spread out over the tile surface filling the spaces, and the residue wiped away. When done properly, this technique provides a uniform and attractive result.

The corners between perpendicular walls present a problem however. The above-described grouting technique cannot be employed in the corners. Here a caulking gun, or other similar device, is used to inject the grout. In bathrooms or other areas exposed to water, such corners are often filled with silicone rubber caulking, which as a practical matter can only be applied with a caulking gun.

The installer uses a caulking gun by squeezing a trigger, which causes the caulking substance to flow from a pointed nozzle, while at the same time moving the nozzle along the corner. Unfortunately, it is very difficult to achieve a uniform and attractive result using a caulking gun. The caulking substance flows from the nozzle more quickly when the trigger is first squeezed. If the installer does not precisely regulate the speed at which the caulking gun is moved along the wall, an irregular and unattractive result will be achieved.

One solution to this problem has been to adhere masking tape along each side of the corner. This is a very time-consuming and difficult procedure however. The two separate strips of tape must be applied at an equal distance from the corner and be kept parallel to each other along the entire length of the wall.

U.S. Ser. No. 10/489,737, the contents of which are expressly incorporated herein by reference, discloses an adhesive tape that can be easily adhered in the corner created by perpendicular walls, and which creates an evenly-spaced, parallel channel in which grout or caulk can be applied. The present application provides, inter alia, an improved method of corner grouting.

BRIEF DESCRIPTION OF THE DRAWINGS

The present invention will be described with reference to the following figures, wherein.

DETAILED DESCRIPTION OF THE INVENTION

Figure 1:
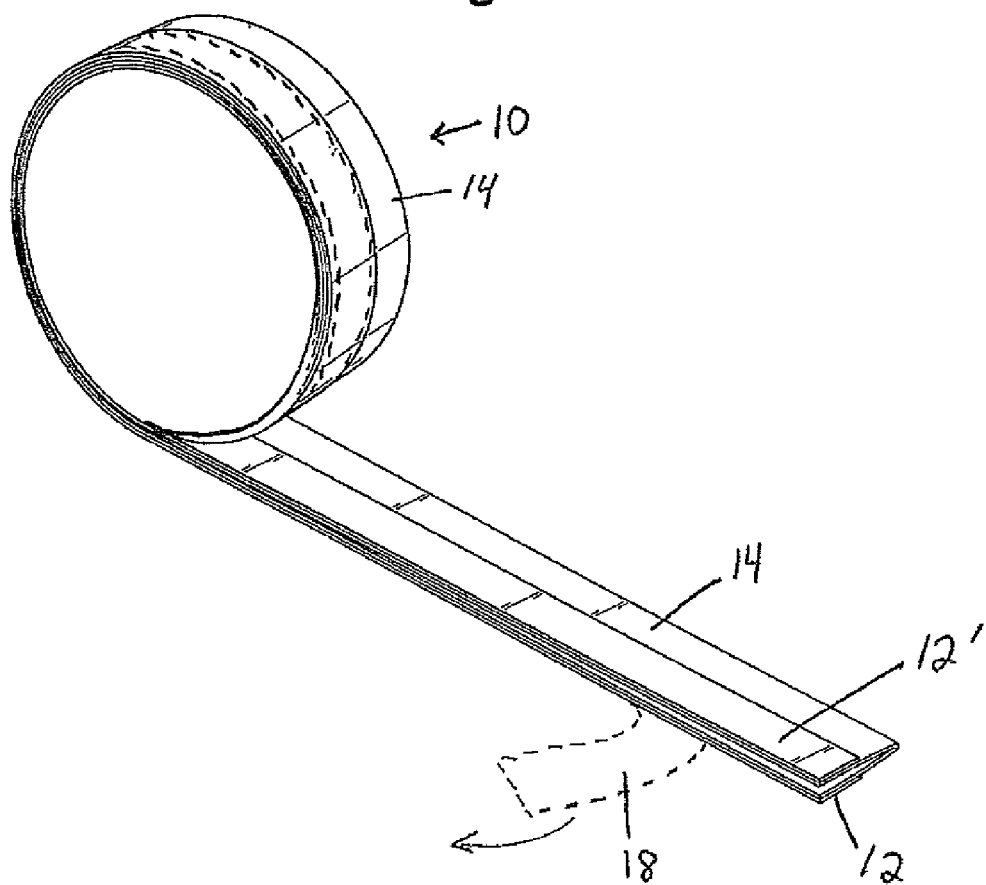
FIGS. 1, 2 and 3 are perspective views of a tape roll according to one aspect of the invention.
Figure 2:
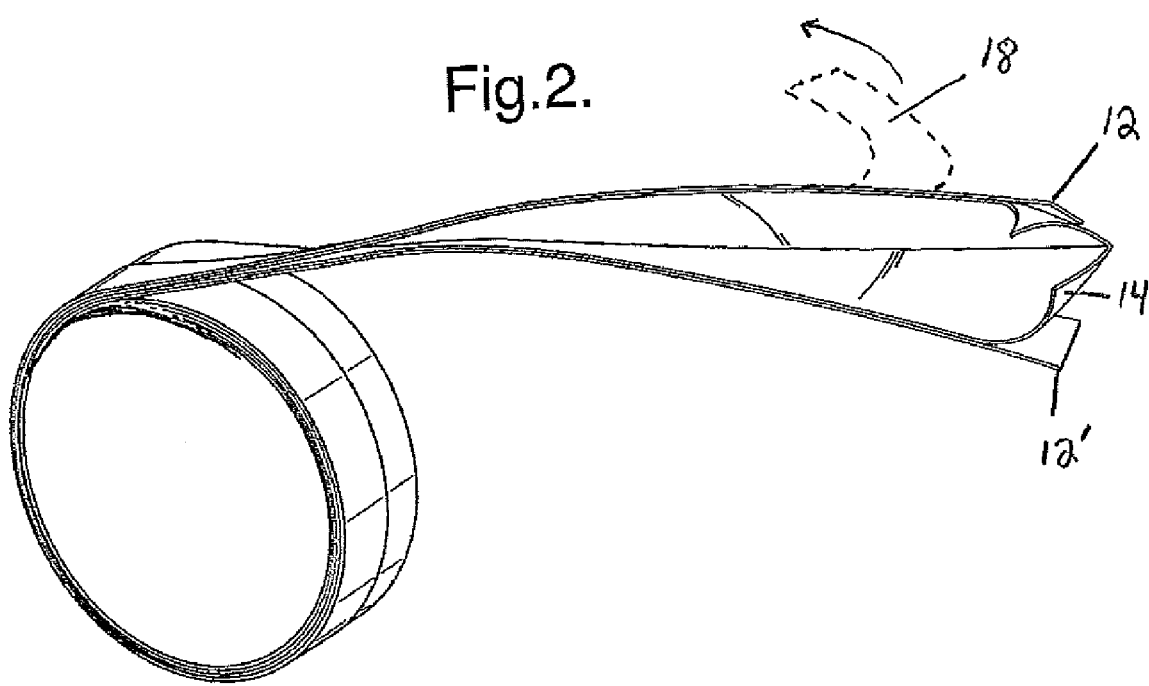
Figure 3:
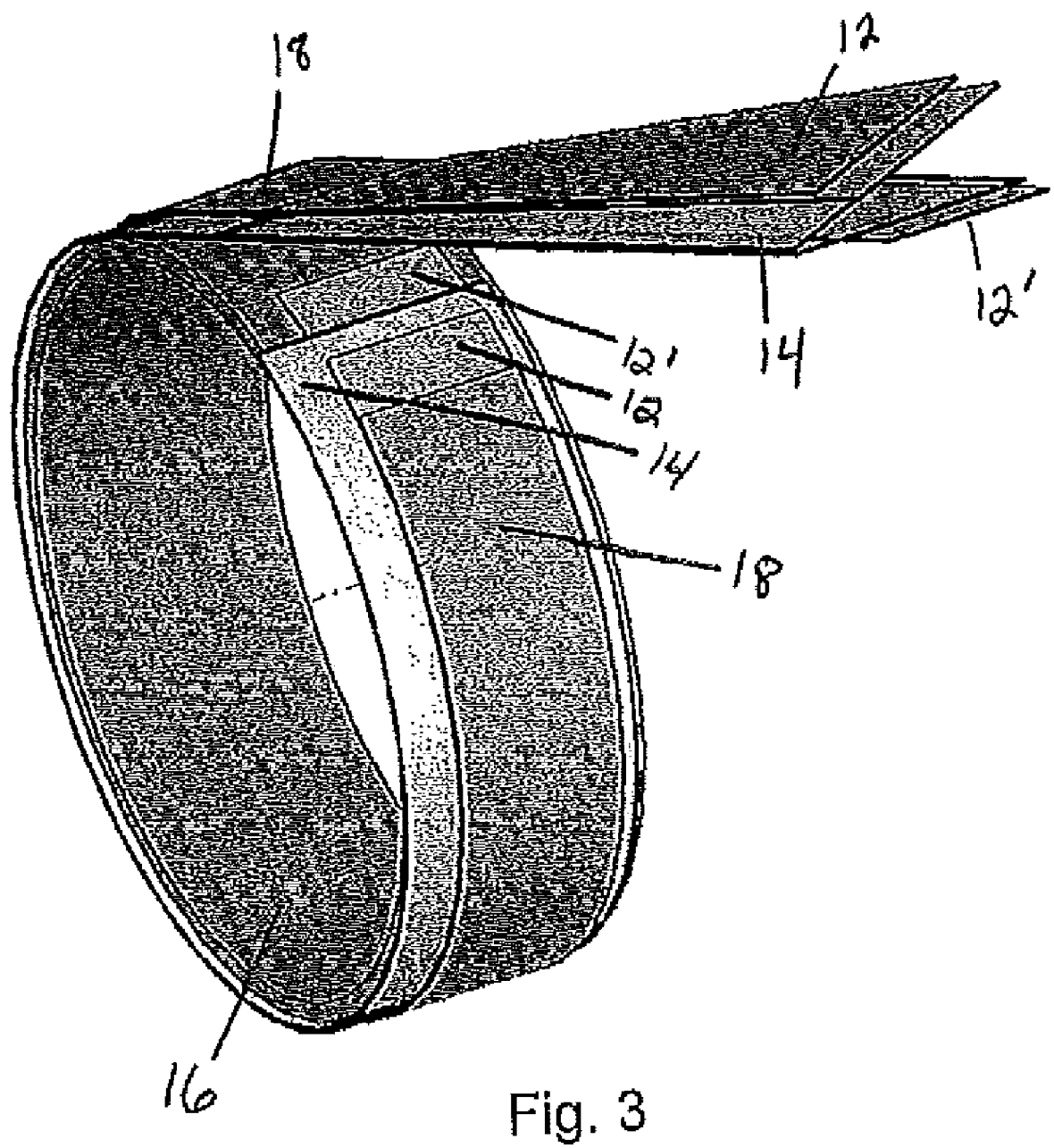

According to one aspect of the invention a method of caulking or grouting is provided, utilizing a tape roll as depicted in FIGS. 1, 2 and 3.

As depicted in FIG. 1, the tape according to the invention is packaged as a roll 10. As will become evident below, this packaging is not only convenient, but is also important for the function of the invention.

The tape according to the invention comprises two double-sided adhesive strips, an outer adhesive strip 12 and an inner adhesive strip 12'. Adhesive strips 12 and 12' have a front side and a back side. As shown in FIGS. 2 and 3, said backsides of said adhesive strips 12 and 12' are attached to a backing strip 14 such that adhesive strips 12 and 12' are parallel to one another when the backing strip is in an unfolded state. Backing strip 14 is preferably made of a flexible plastic film or other suitable nonadhesive material.

Adhesive strips 12 and 12' are affixed along but not extending past the outer edges of backing strip 14 such that, when backing strip 14 is folded in half and packaged as roll 10, adhesive strips 12 and 12' are in vertical alignment with one another, with the now-folded backing strip 14 sandwiched between them as depicted in FIG. 1. As can be further appreciated from FIG. 1, the width of backing strip 14 must be greater than two times the width of adhesive strip 12. This is in order to provide an exposed portion of backing strip 14 extending past the edges of adhesive strips 12 and 12' as shown in FIG. 1.

The roll 10 further comprises a cylindrical core 16 about which the tape is rolled. Core 16 has a width equal to or preferably less than the width of the rolled tape, such that the edges of the core do not extend past the edges of the tape. The tape further comprises a non-adhesive divider strip 18, illustrated with dashed lines in FIGS. 1 and 2, and shown in FIG. 3. Divider strip 18 is arranged on top of outer adhesive strip 12, such that when the tape is rolled together said strip does not become stuck to inner strip 12' of a successive turn of the roll. In other words, the tape is rolled together such that divider strip 18 appears on the outside of the final turn of the tape roll.

The method according to one aspect of the invention comprises forming a uniform and attractive bead of caulk or grout in a corner between a first wall 20 and a second wall 22. It should be appreciated, however, that the method can be applied to a corner between many different surfaces, such as for example a countertop and a wall.

The tape according to the invention is used by first unrolling a short length of tape from role 10. The divider strip is thereafter peeled back, exposing a portion of upper strip of adhesive tape 12. Roll 10 is thereafter placed flush against first wall 20, such that the folded edge of backing strip 14 is inserted into the corner. Pressure is applied to roll 10 in the direction of second wall 22, such that outer adhesive strip 12 adheres to second wall 22.

Figure 4:
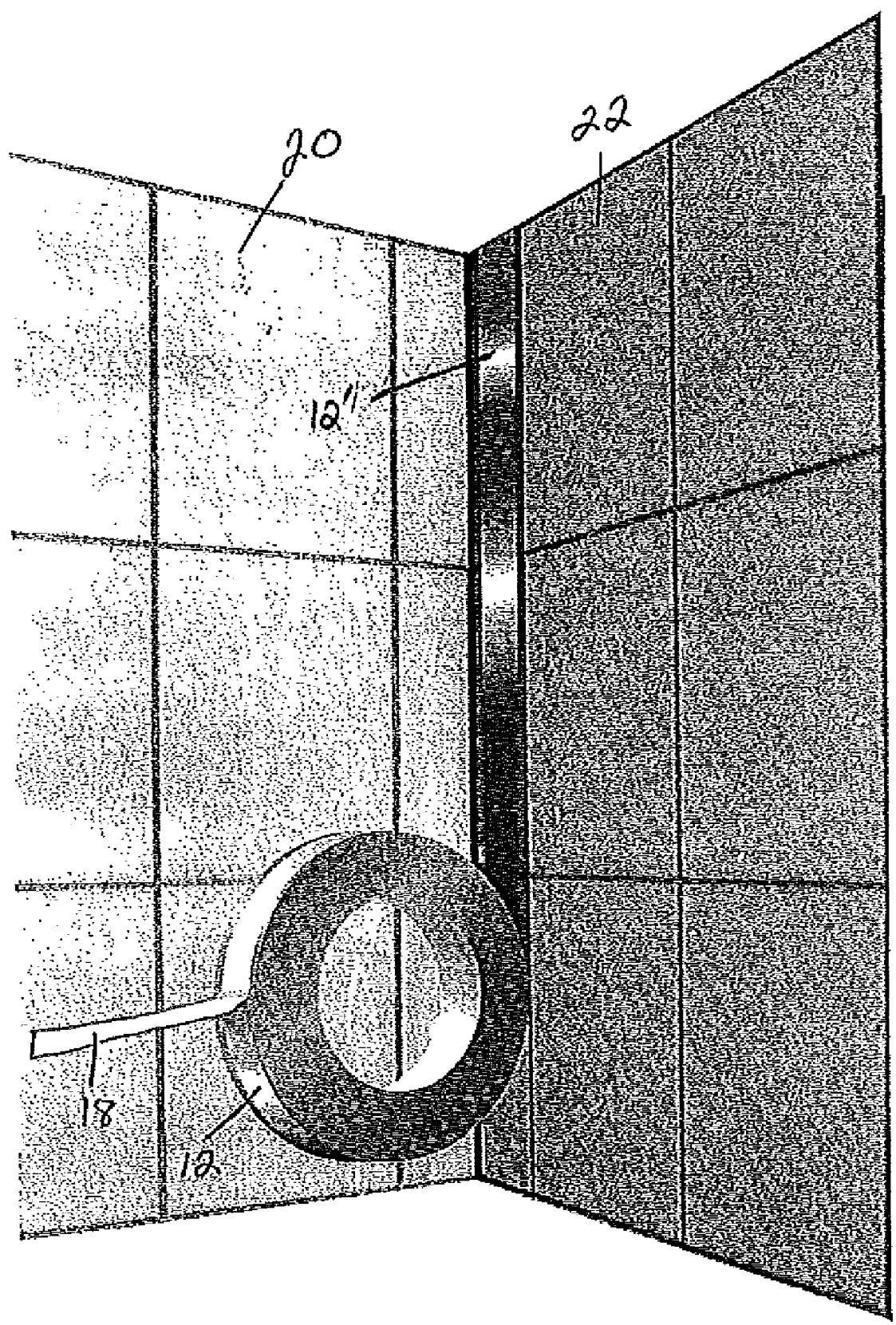
FIG. 4 is a perspective illustration of a tape-affixing step of the method.

As shown in FIG. 4, Roll 10 is thereafter moved longitudinally along the corner, while maintaining flush contact with first wall 20, and applying pressure against second wall 22. Adhesive strip 12 is thus automatically affixed to second wall 22 along the length of the corner as the tape unrolls. Divider strip 18 is continuously removed as the tape unrolls by pulling on the divider strip with one hand, while the roll is moved along the corner with the other hand. Because the edges of core 16 do not extend beyond the folded edge of backing strip 14, the roll itself can be used as guide, allowing the tape to be adhered in a rapid manner along the entire length of second wall 22 in a smooth, continuous motion.

Figure 5:
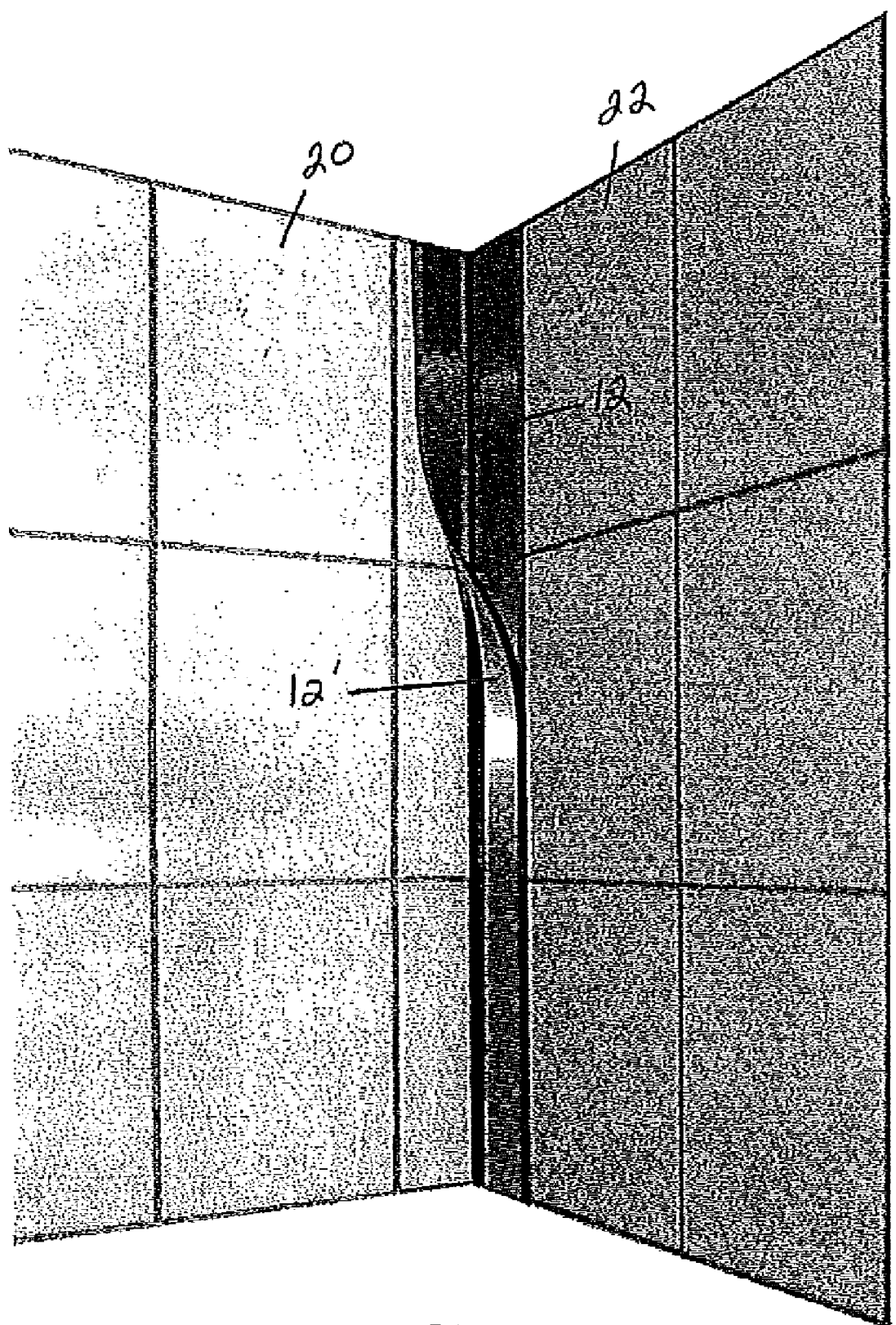
FIG. 5 is a perspective illustration of a tape-unfolding step of the method.

After outer strip 12 has been affixed along the entire length of second wall 22, the tape is cut from the roll. Thereafter, the tape is unfolded, and inner adhesive strip 12' is pressed against first wall 20, as shown in FIG. 5. Because the tape has first been adhered along the entire length of second wall 22, the unfolding operation is much more precise and easy to accomplish than had one unrolled a greater length of tape and attempted to affix the tape to both walls simultaneously along the corner. After inner strip 12' is affixed to first wall 20, the backing strip 14 is removed, exposing a perfectly parallel channel between strips 12 and 12'.

Figure 6:
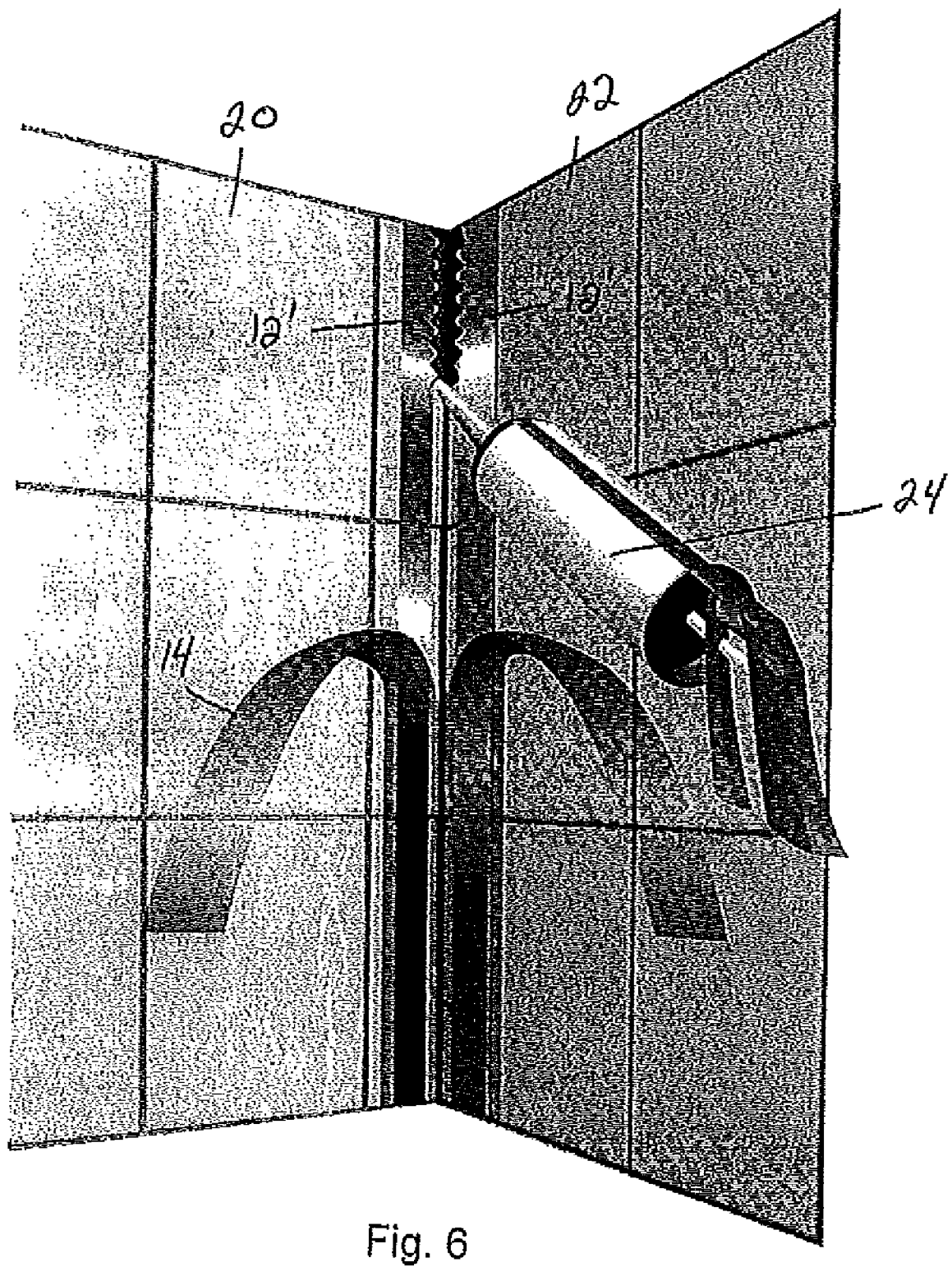
FIG. 6 is perspective illustration of a caulking or grouting step of the method.
Figure 7:
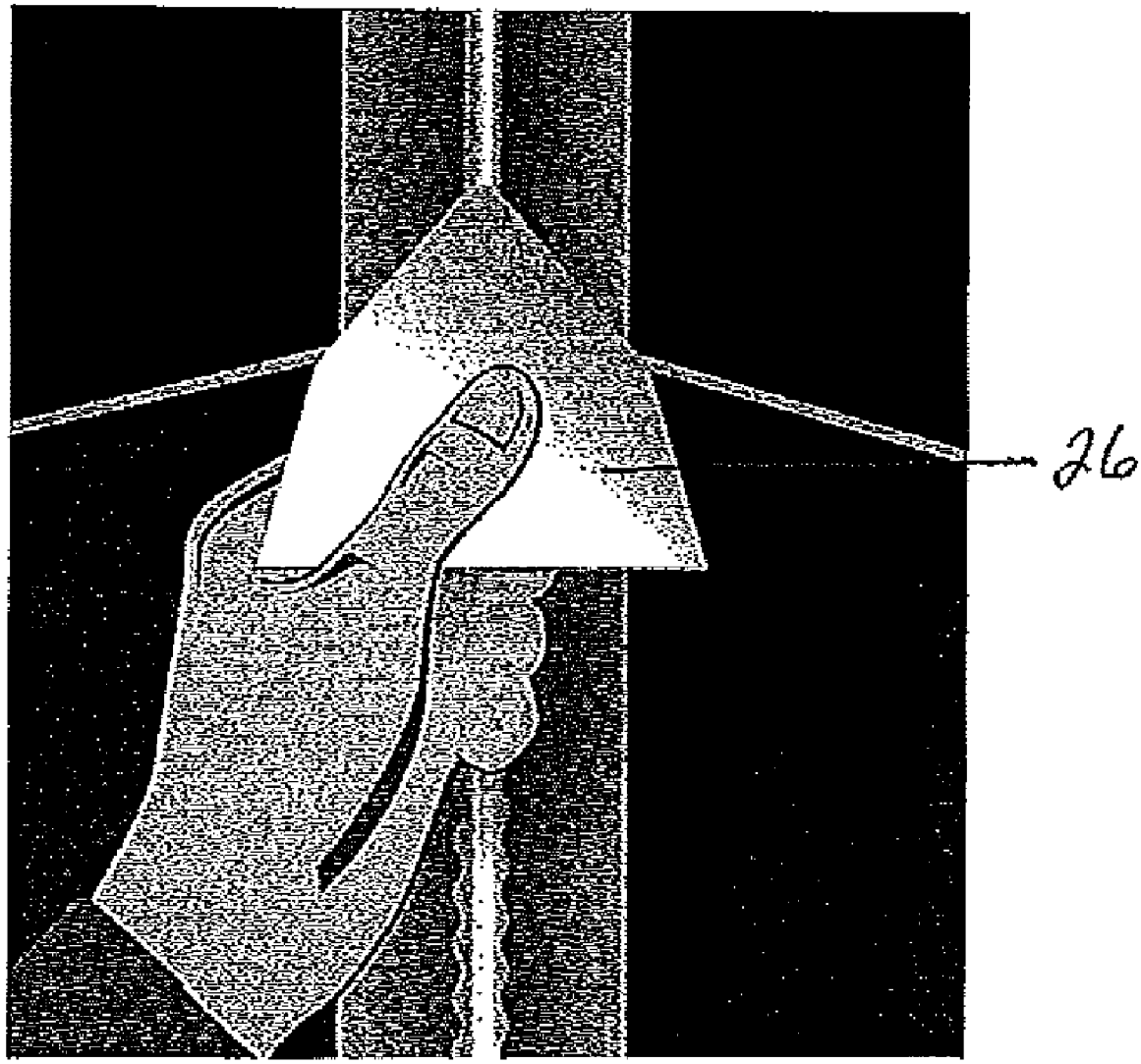
FIG. 7 perspective illustration of a caulk or grout smoothing and removal step of the method.

As shown in FIG. 6, a caulking gun 24 is then utilized to apply the caulk or grout in the space between adhesive strips 12 and 12'. After the caulk or grout has been applied, according to one aspect of the invention, a specially designed caulk or grout removal tool 26 is used to smooth out and remove excess caulk or grout, as depicted in FIG. 7. The tool comprises a curved tip, the diameter of the curve of which is predetermined to correspond to the space between the strips of adhesive tape, and according to one aspect of the invention is packaged together with the tape as a kit. The tip of the tool is inserted into the corner, and drawn along the corner, smoothing and remove excess grout. Thereafter the strips are removed from the wall, leaving an attractive and uniform bead of caulk or grout in the corner.

The invention claimed is:

1. A method for caulking or grouting a corner between two surfaces, the method comprising:
    a. Providing a roll of tape comprising two elongated strips of double-sided adhesive tape, an outer strip (12) and an inner strip (12'), said strips having a front side, a back side, an inside edge and an outside edge, said strips of double-sided adhesive tape being spaced apart in parallel arrangement to one another such that a channel is formed therebetween, with the back sides of said strips of double-sided adhesive tape being affixed in direct contact with a first side of a removable, non-adhesive flexible film (14) having a width greater than the combined widths of said strips of double-sided adhesive tape (12 and 12'), wherein the strips of double sided adhesive tape are affixed to the removable film such that the outside edges of the strips do not extend past the outside edges of the removable film, and further wherein said flexible film (14) is folded along the centreline of the channel between said strips of double-sided adhesive tape (12 and 12') such that the second side of the flexible film is folded back upon itself thus leaving the folded edge of the non-adhesive film protruding past the inside edges of the strips of double sided adhesive tape, said tape being further rolled upon a cylindrical core (16), said core having a width equal to or less than the width of folded backing strip 14, and further comprising a non-adhesive divider strip 18 arranged on top of the outer strip of adhesive tape such that the divider strip appears on the outside of the final turn of the tape roll,
    b. Peeling back a segment of the dividing strip from the end of the outer adhesive strip,
    c. Placing the roll of tape flush against a first of the surfaces forming the corner, and pressing the roll against a second of the surfaces forming the corner such that the now-exposed adhesive surface of the outer adhesive strip adheres to the second surface, and wherein the folded edge of backing strip 14 is inserted into the corner,
    d. Moving the roll longitudinally along the corner while maintaining the roll in flush contact with the first surface and applying pressure against the second surface, progressively unrolling tape from the roll and unpeeling the dividing strip, such that the outer adhesive strip is affixed to the second surface along the entire length of the corner,
    e. Cutting the tape from the roll,
    f. Unfolding the backing strip and pressing the inner adhesive strip against the first surface along the entire length of the corner,
    g. Removing the backing strip, revealing a parallel channel in the corner between the inner and outer adhesive strips,
    h. Applying caulk or grout in the channel between the adhesive strips along the length of the corner, and
    i. Removing the adhesive strips from the wall.

2. The method according to claim 1, wherein the core has a width less than the width of the folded backing.

3. The method according to claim 1 or 2, further comprising the step of smoothing and removing excess caulking or grout from the corner prior to removal of the adhesive strips from the wall.

4. The method according to claim 3, wherein the caulking or grout is smoothed and excess caulking or grout removed by a tool having a curved tip, the diameter of the curve of which corresponds to the width of the channel between the adhesive strips.

* * * * *